United States Patent
Huang et al.

(10) Patent No.: US 12,061,859 B2
(45) Date of Patent: *Aug. 13, 2024

(54) MARKDOWN DATA CONTENT WITH ACTION BINDING

(71) Applicant: Transposit Corporation, San Francisco, CA (US)

(72) Inventors: Tina Huang, San Francisco, CA (US); Joseph Berceli-Wain, McMinnville, OR (US)

(73) Assignee: Transposit Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,005

(22) Filed: May 12, 2023

(65) Prior Publication Data

US 2023/0281378 A1  Sep. 7, 2023

Related U.S. Application Data

(63) Continuation of application No. 17/249,252, filed on Feb. 24, 2021, now Pat. No. 11,704,474.

(Continued)

(51) Int. Cl.
*G06F 16/958* (2019.01)
*G06F 16/93* (2019.01)
(Continued)

(52) U.S. Cl.
CPC ............ *G06F 40/106* (2020.01); *G06F 16/93* (2019.01); *G06F 16/955* (2019.01); *G06F 16/958* (2019.01); *G06F 40/14* (2020.01)

(58) Field of Classification Search
CPC ...... G06F 40/106; G06F 16/93; G06F 16/955; G06F 16/958; G06F 40/14; G06F 40/143; G06F 40/169; G06F 40/134; G06Q 10/103
See application file for complete search history.

(56) References Cited

U.S. PATENT DOCUMENTS 7,149,966 B2   12/2006  Jones et al.
7,367,014 B2 *  4/2008  Griffin ................... H04L 67/02
                                                717/121

(Continued)

FOREIGN PATENT DOCUMENTS

CA    2654861 A1      1/2008
CA    2654861 A1 *   1/2008  ........... G06F 16/958
(Continued)

OTHER PUBLICATIONS

U.S. Appl. No. 17/249,252, filed Feb. 24, 2021, Markdown Data Content With Action Binding.
(Continued)

*Primary Examiner* — Hassan Mrabi
(74) *Attorney, Agent, or Firm* — Schwegman Lundberg & Woessner, P.A.

(57) ABSTRACT

Various embodiments support or provide for binding markdown data content to an action. In particular, some embodiments provide a document editor for binding an action to content of a document, such as a markdown document. Such embodiments can enable a user to edit or generate a document using markdown syntax that links and binds the document to metadata, which enables some embodiments to enhance the content the document beyond what standard markdown permits, such as a user invokable action.

20 Claims, 16 Drawing Sheets

Related U.S. Application Data

(60) Provisional application No. 62/981,152, filed on Feb. 25, 2020.

(51) Int. Cl.
 G06F 16/955 (2019.01)
 G06F 40/106 (2020.01)
 G06F 40/14 (2020.01)

(56) References Cited

U.S. PATENT DOCUMENTS

| | | | |
|---|---|---|---|
| 8,027,976 B1* | 9/2011 | Ding | G06F 16/93 707/755 |
| 8,458,585 B1* | 6/2013 | Grieve | G06F 16/9574 715/255 |
| 9,201,852 B2 | 12/2015 | Ge | |
| 9,852,117 B1* | 12/2017 | Leschner | G06F 40/143 |
| 9,870,205 B1* | 1/2018 | Elliot | G06T 11/206 |
| 10,452,771 B1* | 10/2019 | Yun | G06F 40/169 |
| 10,853,431 B1* | 12/2020 | Lin | G06F 16/958 |
| 11,341,208 B2* | 5/2022 | Reddy Vennapusa | H04W 12/084 |
| 11,431,663 B2* | 8/2022 | Zhang | H04L 51/226 |
| 11,704,474 B2 | 7/2023 | Huang et al. | |
| 2014/0075283 A1* | 3/2014 | Coursol | G06F 16/958 715/234 |
| 2014/0201621 A1 | 7/2014 | Fleishman et al. | |
| 2014/0281903 A1* | 9/2014 | Le Chevalier | G06F 16/93 715/234 |
| 2016/0110313 A1* | 4/2016 | Prakash | G06F 30/00 715/202 |
| 2016/0267434 A1* | 9/2016 | Phinney | G06Q 10/103 |
| 2016/0357717 A1* | 12/2016 | Metz | G06T 13/80 |
| 2017/0032415 A1* | 2/2017 | Chen | G06Q 30/0249 |
| 2017/0124035 A1* | 5/2017 | Buttolo | G06F 3/04847 |
| 2018/0005186 A1* | 1/2018 | Hunn | G06F 40/166 |
| 2018/0365201 A1* | 12/2018 | Hunn | G06F 40/143 |
| 2019/0044949 A1* | 2/2019 | Bartfai-Walcott | H04W 12/63 |
| 2019/0147006 A1* | 5/2019 | Morris | G06F 16/958 715/205 |
| 2019/0155870 A1* | 5/2019 | Prakash | G06F 40/103 |
| 2019/0163469 A1* | 5/2019 | Sreenivasa | H04L 63/08 |
| 2020/0004873 A1* | 1/2020 | Chang | G06F 16/31 |
| 2020/0314205 A1* | 10/2020 | Cheng | H04L 67/60 |
| 2020/0334304 A1* | 10/2020 | Reddy Vennapusa | G06F 16/958 |
| 2020/0364132 A1* | 11/2020 | Underseth | G06F 11/3664 |
| 2020/0379739 A1* | 12/2020 | Bhownani | G06F 8/34 |
| 2021/0240818 A1* | 8/2021 | Seksenov | G06F 16/986 |
| 2021/0264096 A1 | 8/2021 | Huang et al. | |
| 2021/0279160 A1* | 9/2021 | Huang | G06F 3/0483 |
| 2022/0058334 A1* | 2/2022 | Joshi | G06F 11/3692 |
| 2022/0206759 A1* | 6/2022 | Samuel | G06F 8/10 |
| 2022/0207095 A1* | 6/2022 | Giardalas | G06F 40/14 |

FOREIGN PATENT DOCUMENTS

| | | | | |
|---|---|---|---|---|
| CN | 103634741 A | | 3/2014 | |
| CN | 103634741 A | * | 3/2014 | |
| CN | 102880606 B | | 3/2017 | |
| CN | 102880606 B | * | 3/2017 | |
| CN | 108604236 A | * | 9/2018 | G06F 16/367 |
| CN | 108604236 A | | 9/2018 | |
| CN | 110457656 A | * | 11/2019 | G06F 8/38 |
| CN | 110457656 A | | 11/2019 | |
| CN | 111273903 A | | 6/2020 | |
| CN | 111273903 A | * | 6/2020 | G06F 16/958 |
| CN | 112799718 A | | 5/2021 | |
| CN | 112799718 A | * | 5/2021 | |
| CN | 114138244 A | | 3/2022 | |
| CN | 114138244 A | * | 3/2022 | |
| CN | 108027825 B | * | 4/2022 | G06F 16/2228 |
| CN | 108027825 B | | 4/2022 | |
| CN | 110390063 B | * | 4/2022 | G06F 16/957 |
| CN | 110390063 B | | 4/2022 | |
| CN | 114546356 A | | 5/2022 | |
| CN | 114546356 A | * | 5/2022 | |
| CN | 114626358 A | | 6/2022 | |
| CN | 114626358 A | * | 6/2022 | |
| JP | 2019207527 A | * | 12/2019 | |
| JP | 2019207527 A | | 12/2019 | |
| WO | WO-2018006072 A1 | | 1/2018 | |
| WO | WO-2018006072 A1 | * | 1/2018 | G06F 21/645 |
| WO | WO-2021173858 A1 | * | 9/2021 | G06F 11/0781 |
| WO | WO-2021173858 A1 | | 9/2021 | |
| WO | WO-2021174249 A1 | | 9/2021 | |
| WO | WO-2021202569 A1 | * | 10/2021 | G06F 40/30 |
| WO | WO-2021202569 A1 | | 10/2021 | |

OTHER PUBLICATIONS

"U.S. Appl. No. 17/249,252, Non Final Office Action mailed Sep. 16, 2022", 15 pgs.

"U.S. Appl. No. 17/249,252, Notice of Allowance mailed Feb. 23, 2023", 8 pgs.

"U.S. Appl. No. 17/249,252, Response filed Jan. 17, 2023 to Non Final Office Action mailed Sep. 16, 2022", 11 pgs.

"International Application Serial No. PCT/US2021/070189, International Preliminary Report on Patentability mailed Sep. 9, 2022", 9 pgs.

"International Application Serial No. PCT/US2021/070189, International Search Report mailed May 20, 2021", 2 pgs.

"International Application Serial No. PCT/US2021/070189, Written Opinion mailed May 20, 2021", 7 pgs.

"U.S. Appl. No. 17/249,252, PTO Response to Rule 312 Communication mailed Jun. 13, 2023", 2 pages.

* cited by examiner

FIG. 5

MARKDOWN DATA CONTENT WITH ACTION BINDING

CROSS REFERENCE TO RELATED APPLICATIONS

This application is a continuation of U.S. patent application Ser. No. 17/249,252, filed Feb. 24, 2021, which application claims the benefit of priority of U.S. Provisional Application No. 62/981,152 entitled "MARKDOWN EDITOR WITH ACTION BINDING" and filed on Feb. 25, 2020, the entire contents of which are incorporated herein by reference.

TECHNICAL FIELD

The present disclosure relates generally to markdown data content, and, more particularly, various embodiments described herein provide for systems, methods, techniques, instruction sequences, and devices that bind markdown data content to an action.

BACKGROUND

Electronic documentations, such as those created using a markup language, are often used to capture information relating to software development, system development, and information technology (IT)-related activities. Markup-language documents are popular amongst the development and IT community for their ease of use (e.g., simple markup language syntax) and the ability for markup-language to be rendered as formatted text when accessed through common development/IT tools, such as integrated development environments (IDEs), text editors, and communications platforms (e.g., SLACK). Presently, markdown is one of the most popular markup languages in use for this purpose. Documents written using markdown are commonly referred to as markdown documents or markdown files. Examples of a markdown document can include, for instance, a markdown document used by a software developer to document their development of a software application, or a markdown document by an IT professional to document a runbook for troubleshooting a current system issue.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

FIG. 5 illustrates an example graphical user interface that is displaying markdown data content, according to some embodiments.

DETAILED DESCRIPTION

Figure 1:
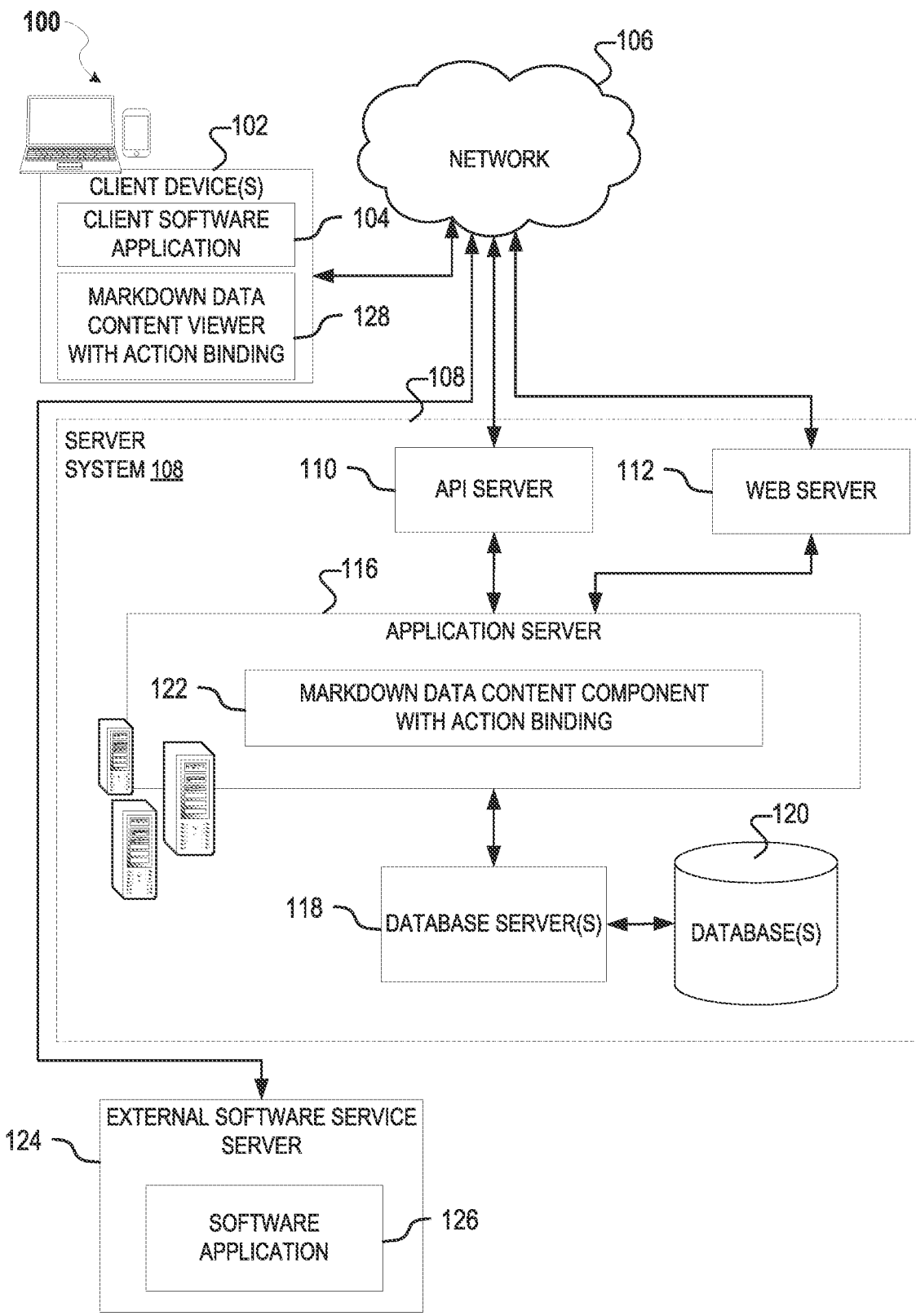
FIG. 1 is a block diagram showing an example data system that includes a markdown data content viewer with action binding and a markdown data content component with action binding that support markdown data content, according to some embodiments.

Various embodiments described herein support or provide for binding markdown data content to an action. For instance, some embodiments provide a document editor for binding an action to content of a document, such as a markdown document. Such embodiments can enable a user to edit or generate (e.g., create) a document using markdown syntax that links and binds the document to metadata, which enables some embodiments to enhance the content of the document beyond what standard markdown permits, such as a user invokable action.

For instance, an embodiment can enable a markdown file (e.g., file1.md) to comprise the following content data:

[Restart ECS](https://transposit.com/action1234)

An embodiment can recognize (e.g., detect) this content data and automatically determine, based on the link content, that the link is a particular type of link that binds to additional information (e.g., additional metadata), such as an action a user can invoke when viewing the markdown file through a markdown viewer. For instance, the example above can be rendered as a graphical button comprising a label "Restart ECS" and binds to metadata located at Universal Resource Locator (URL) "https://transposit.com/action1234," where the metadata describes a user invokable action for restarting an AMAZON Elastic Container Service (ECS) instance. The additional information can be stored in an in an auxiliary datastore.

According to some embodiments, metadata is bound to content of a markdown file to enhance the experience around links listed in the content of the markdown file. For instance, with respect to a communication system (such as SLACK), the markdown file can be opened and displayed in the communication system user interface, and the metadata bound to a link described in content of the markdown file can be rendered as a graphical user interface button that a user can select to invoke an associated action (invoke an action in the background rather than navigating to an address (e.g., URL) specified by the link).

As used herein, a runbook can comprise a listing or compilation of one or more actions, routines, operations, or workflows that a user, such as a system administrator, could use or have performed with respect to one or more computer systems. For instance, a user could use a runbook used with a computer system for information technology (IT), development operations (DevOps), maintenance, or troubleshooting purposes. An example runbook could include, for example, one that comprises an ordered list of actions/routines/operations performed to resolve a detected issue with respect to a computer system. As also used herein, markdown data content can comprise text written in accordance with a version of markdown language (e.g., written using syntax defined by a version of markdown language).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a markdown data content viewer with action binding 128 (hereafter, the markdown data content viewer 128) and a markdown data content component with action binding 122 (hereafter, the markdown data content component 122) that support markdown data content, according to some embodiments. By including the markdown data content viewer 128 and the markdown data content component 122, the data system 100 can enable one or more of creation (e.g., generation), editing (e.g., modifying or updating), accessing (e.g., obtaining), or displaying (e.g., viewing) of markdown data content that includes one or more links associated with one or more metadata that can enhance the markdown data content as described herein.

In particular, the markdown data content component 122 can provide a user at the client device 102 with access to markdown data content (e.g., provide in response to a client request), and can enable the user to add or edit a link in the markdown data content and associate the link with metadata (e.g., via a web-based editor). For some embodiments, markdown data content comprises an expression describing a link associated with metadata (e.g., additional metadata), which can cause a markdown data content viewer (e.g., the markdown data content viewer 128) to render a graphical element in association with the metadata. According to some embodiments, the expression uses markdown syntax configured to bind the markdown data content to the metadata. The link can comprise a domain name address (e.g., to the application server 116 hosting the markdown data content component 122) and can comprise a universal resource locator. Depending on the embodiment, the markdown data content can be stored as a markdown file.

For some embodiments, the metadata describes a user invokable action with respect to an external system, such as an external software service server 124. For example, the user invokable action can include, without limitation, starting, restarting, pausing, or stopping a service operating on the external system. For some embodiments, the user invokable action is associated with a workflow of operations (e.g., runbook workflow) to be performed with respect to the external system when the user invokable action is invoked by a user. Additionally, for some embodiments, the markdown data content component 122 enables the server system 108 to execute a user invokable action in response to a user interacting with a graphical element (e.g., button) rendered for a link in markdown data content as described herein.

For various embodiments, the markdown data content viewer 128 enables a user at the client device 102 to access (e.g., request) markdown data content from the server system 108. Once the requested markdown data content is accessed, the markdown data content viewer 128 can enable the client device 102 process the accessed markdown data content to render the markdown data content for display through a graphical user interface at the client device 102. For some embodiments, in response to determining that a link, described by the markdown data content, is associated with first metadata, the markdown data content viewer 128 accesses the metadata (e.g., from the markdown data content component 122 or some other location external to the client device 102) and renders a graphical element in association with the metadata. As noted herein, the metadata can describe a user invokable action with respect to an external system, such as the external software service server 124. Eventually, the markdown data content viewer 128 can receive a user selection of the graphical element and, in response, the markdown data content viewer 128 can cause execution of the user invokable action without navigating away from rendered markdown data content. For example, the markdown data content viewer 128 can cause execution of the user invokable action by sending a request to the markdown data content component 122 to execute the user invokable action. In response to the request, the markdown data content viewer 128 can facilitate execution of the user invokable action on the external system (e.g., the external software service server 124), such as through an API call to the external system.

As shown, the data system 100 includes one or more client devices 102, a server system 108, the external software service server 124, and a network 106 (e.g., including Internet, wide-area-network, local-area-network, wireless network, etc.) that communicatively couples them together. Each client device 102 can host a number of applications, including a client software application 104 and the markdown data content viewer 128. Each of the client software application 104 and the markdown data content viewer 128 can communicate data with the server system 108 via a network 106. Accordingly, each of the client software application 104 and the markdown data content viewer 128 can communicate and exchange data with the server system 108 via the network 106. Additionally, the external software service server 124 can communicate and exchange data with the server system 108 via the network 106. The data exchanged between the client software application 104, between the client software application 104 and the server system 108, and between the server system 108 and the external software service server can include, without limitation, data objects, requests (e.g., API calls), responses (e.g., API responses), public/private keys (e.g., API keys), hash values, access rights data, license data, and authentication data (e.g., authentication tokens).

The external software service server 124 can host a software application 126 that provides a software service, which is external to a computing entity (e.g., the client devices 102 or the server system 108) but accessible by the computing entity over the network 106 via a software component (e.g., an API associated with the software service). For instance, the markdown data content component 122 on the server system 108 can access the external software service provided by the external software service server 124, and invoke one or more actions with respect to the external software service, by accessing (e.g., calling) an API at the server system 108. As noted herein, the markdown data content component 122 can cause execution (e.g., performance) of a user invokable action in response to receiving a request from the client device (e.g., the markdown data content viewer 128) to invoke the user invokable action. The external software service server 124 can comprise one or more computing devices that host the software application 126 providing a software service. In this way, the external software service server 124 can support a software service (e.g., AMAZON WEB SERVICES) provided by a third-party organization, such as such as GOOGLE or AMAZON.

The server system 108 provides server-side functionality via the network 106 to the client software application 104 or the markdown data content viewer 128. While certain functions of the data system 100 are described herein as being performed by the markdown data content component 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 or the markdown data content viewer 128 where the client device 102 provides enhanced data object functionality.

The server system 108 supports various services and operations that are provided to the markdown data content viewer 128 by the markdown data content component 122. Such operations include transmitting data from the markdown data content component 122 to the markdown data content viewer 128, receiving data from the markdown data content viewer 128 to the markdown data content component 122, and the markdown data content component 122 processing data generated by the markdown data content viewer 128. This data may include for example, data objects, requests, responses, public/private keys, hash values, access rights data, license data, and authentication data. Data exchanges within the data system 100 may be invoked and controlled through operations of software component environments available via one or more endpoints, or functions available via one or more user interfaces (UIs) of the markdown data content viewer 128, which may include web-based UIs provided by the server system 108 for presentation at the client device 102.

With respect to the server system 108, each of an API server 110 and a web server 112 is coupled to an application server 116, which hosts the markdown data content component 122. The application server 116 is communicatively coupled to a database server 118, which facilitates access to a database 120 that stores data associated with the application server 116.

The API server 110 receives and transmits data (e.g., API calls, commands, data objects, requests, responses, public/private keys, hash values, access rights data, license data, and authentication data) between the client device 102 and the application server 116. Specifically, the API server 110 provides a set of interfaces (e.g., routines and protocols) that can be called or queried by the client software application 104 or the markdown data content viewer 128 in order to invoke functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); interview sessions functionality; business process operations (e.g., starting, generating, etc.); and user communications.

Through one or more web-based interfaces (e.g., web-based UIs), the web server 112 can support various functionality of the markdown data content component 122 of the application server 116 including, without limitation: user registration; login functionality; and data object operations (e.g., generating, storing, retrieving, encrypting, decrypting, transferring, access rights, licensing, etc.).

The application server 116 hosts a number of applications and subsystems, including the markdown data content component 122, which supports various functions and services with respect to various embodiments described herein.

The application server 116 is communicatively coupled to a database server 118, which facilitates access to database(s) 120 in which may be stored data associated with the markdown data content component 122. Data associated with the markdown data content component 122 can include, without limitation, markdown data content, metadata (e.g., metadata files or metadata associated with a link of markdown data content), and source code data (e.g., source code files) associated with a software component environment.

Figure 2:
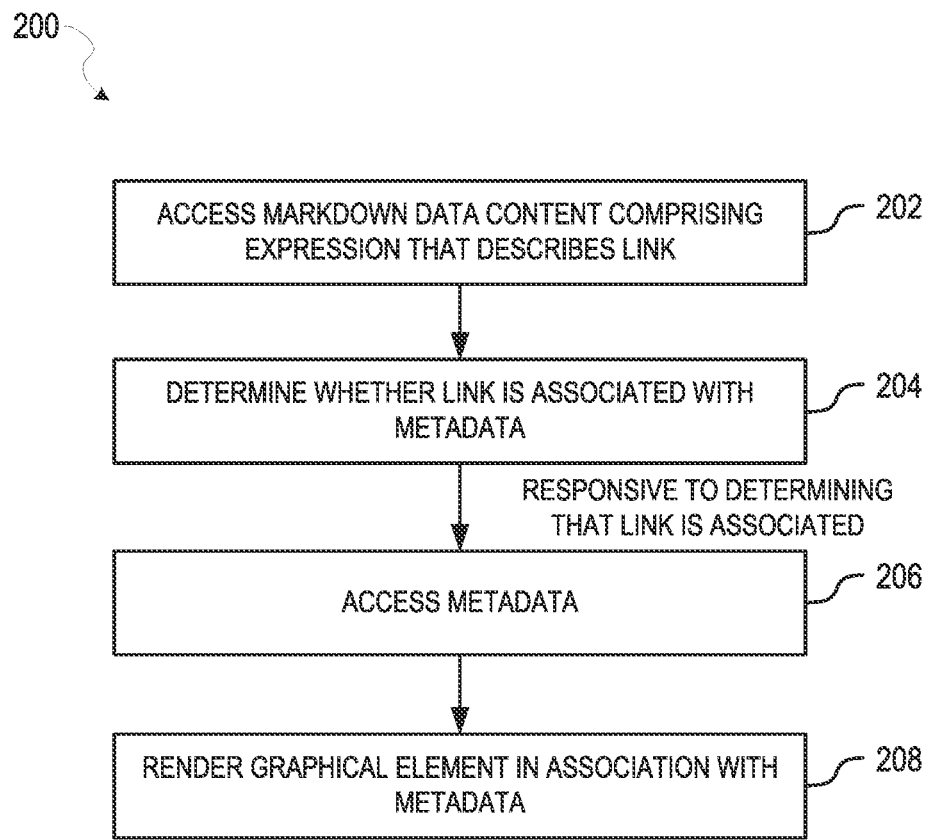
FIGS. 2-4 are flowcharts illustrating example methods for markdown data content with action binding, according to some embodiments.
Figure 3:
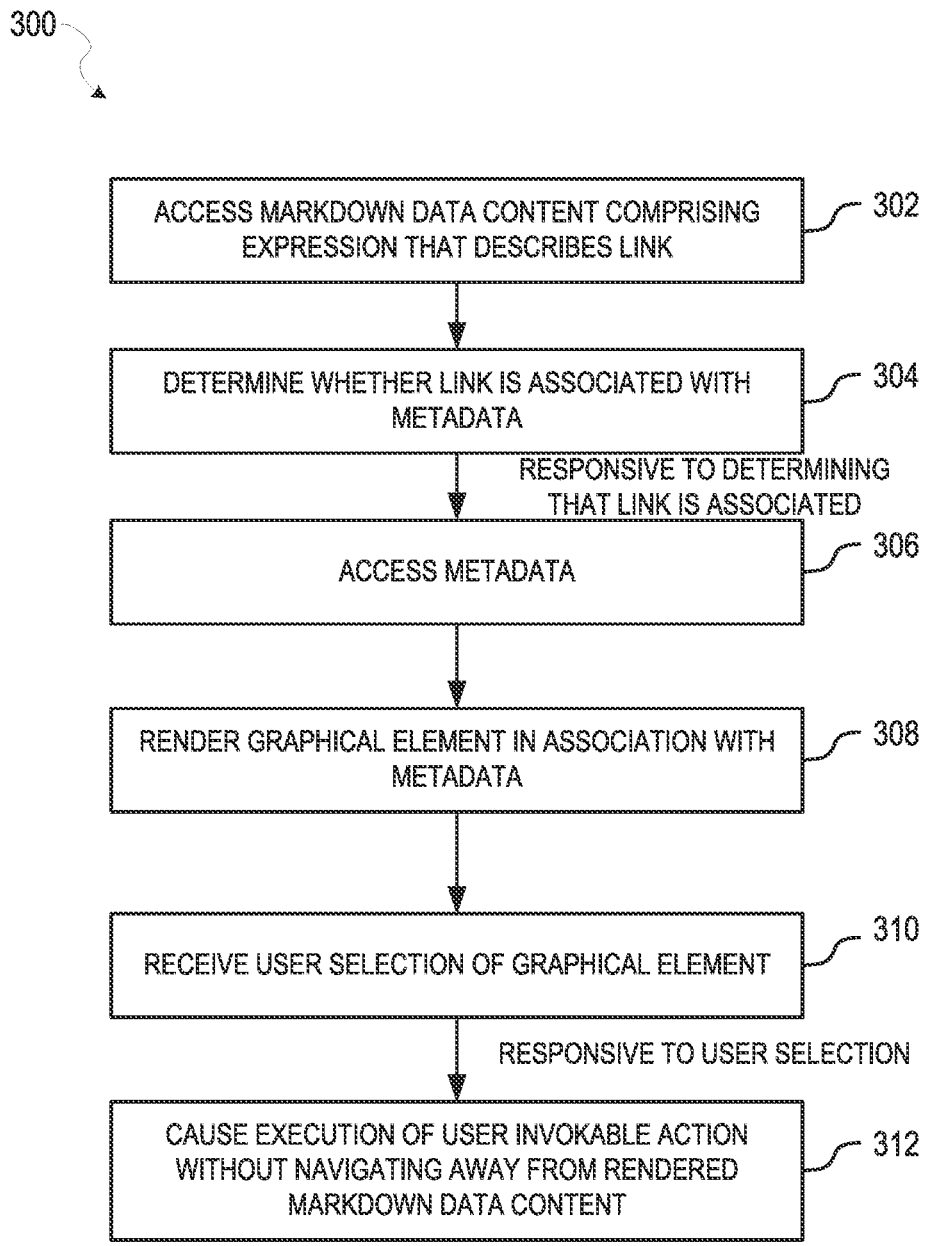
Figure 4:
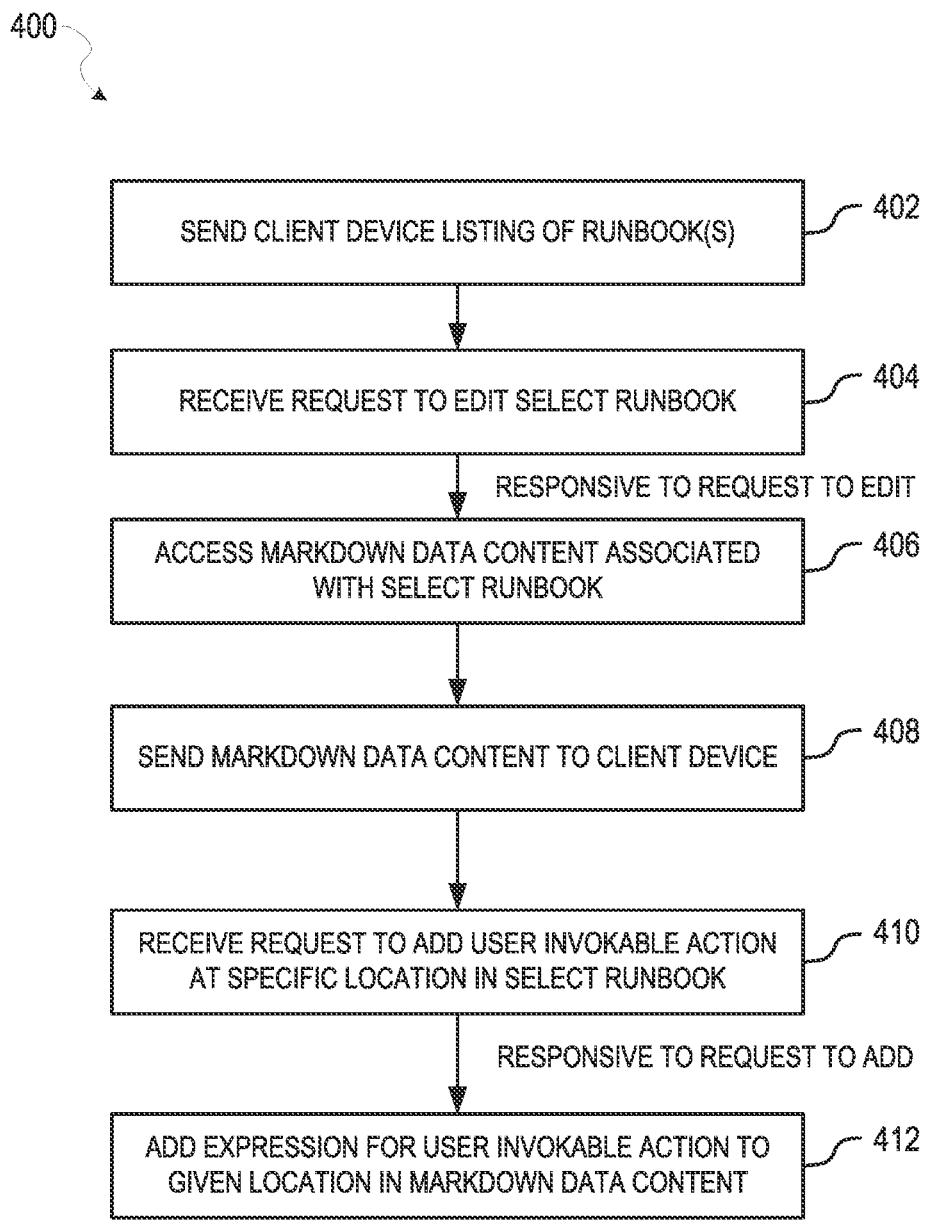

FIGS. 2-4 are flowcharts illustrating example methods for markdown data content with action binding, according to some embodiments. It will be understood that example methods described herein may be performed by a machine in accordance with some embodiments. For example, any one of the methods 200, 300, 400, can be performed by the markdown data content viewer 128, the markdown data content component 122, or a combination of both. An operation of various methods described herein may be performed by a hardware processor (e.g., a central processing unit or graphics processing unit) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to the FIG. 2, the method 200 illustrates an example process for viewing markdown data content, according to some embodiments. For some embodiments, the method 200 is performed on a client device (e.g., 102) by a markdown data content editor (e.g., 128). As shown, at operation 202, a processing device (e.g., of the client device 102) accesses markdown data content that comprises an expression describing a link. For some embodiments, the markdown data content is stored, and provided by a system (e.g., the server system 108), external to the client device. The markdown data content of some embodiments describes a runbook for an external system, where the markdown data content can describe a plurality of links for operations or workflows of the runbook. As noted herein, the access can comprise the processing device sending an access request to the external system. Additionally, for some embodiments, the expression describing the link uses markdown syntax configured to bind the markdown data content to the metadata. Accordingly, the link can be of a particular type of link that binds to additional information, such as the metadata.

Subsequently, the processing device can process the markdown data content, accessed at operation 202, to render the markdown data content for display through a graphical user interface (e.g., at the client device 102). For some embodiments, the processing device processes the markdown data content by operations 204 through 208.

At operation 204, the processing device determines whether the link, in the markdown data content, is associated with metadata. For some embodiments, the metadata is stored on a datastore external to the client device, such as on the external system providing the markdown data content. In response to determining that the link is associated with the metadata, the processing device accesses the metadata (e.g., from the external system) at operation 206.

Thereafter, at operation 208, the processing device renders a graphical element (e.g., on the client device 102) in association with the metadata. For various embodiments, the metadata describes a user invokable action with respect to an external system. The graphical element can include, without limitation, a button of a graphical user interface or the like. The user invokable action can comprise, for example, at least one of starting, restarting, pausing, or stopping a service operating on the external system. For instance, a user invokable action can be bounded to an action that causes an ECS instance restart on AMAZON WEB SERVICES (AWS) with predetermined user credentials. The user invokable action can be associated with a workflow of operations (e.g., for a runbook) to be performed with respect to the external system when the user invokable action is invoked by a user (e.g., invoked by a user on the client device 102). For instance, the link can comprise a URL to an action which causes the workflow to be performed.

Referring now to the FIG. 3, the method 300 illustrates an example process for viewing markdown data content, according to some embodiments. Like the method 200 of FIG. 2, the method 300 can be performed on a client device (e.g., 102) by a markdown data content editor (e.g., 128) of an embodiment. For some embodiments, operations 302, 304, 306, 308 are respectively similar to operations 202, 204, 206, 208 of the method 200 of FIG. 2.

As shown, at operation 310, the processing device (e.g., of the client device 102) receives a user selection of the graphical element rendered by operation 308. For some embodiments, the user selection is received through a markdown data content editor (e.g., 128) on a client device (e.g., 102). In response to the user selection received by operation 310, at operation 312, the processing device causes execution of the user invokable action without (e.g., without the markdown data content viewer 128) navigating away from rendered markdown data content.

Referring now to the FIG. 4, the method 400 illustrates an example process for editing markdown data content, according to some embodiments. For some embodiments, the method 400 is performed on a server system (e.g., 108) by a markdown data content component with action binding (e.g., 122). As shown, at operation 402, a processing device of a system (e.g., the server system 108) sends to a client device (e.g., 102) a listing of one or more runbooks stored on, or in connection with, the system. For example, the client device can access the system through a web browser, and the system can send a web-based interface (e.g., the web server 112) that displays the listing of one or more runbooks on the client device. From the listing, a user at the client device can, for example, select to view a runbook, execute a runbook, edit a runbook, and otherwise manage a runbook (e.g., create a new runbook or delete an existing runbook). For some embodiments, a markdown data content enhanced with a link associated with metadata (as described herein) can implement or otherwise document a runbook, which can be used by a user (e.g., IT professional) to maintain or troubleshoot an issue with respect to a system (e.g., the external software service server 124).

The processing device, at operation 404, receives a request to edit a select runbook in the listing of one or more runbooks. For instance, through a graphical user interface (e.g., web-based interface) presented at a client device, a user at the client device can interact with the graphical user interface to select a runbook from the listing and to choose to edit the select runbook. In response to the request to edit the select runbook, at operation 406, the processing device accesses markdown data content associated with the select runbook. The markdown data content can be stored on the system (e.g., on the database 120) in association with the select runbook, and can comprise markdown syntax that provides content of the select runbook. Subsequently, at operation 408, the processing device sends (or provides) the markdown data content (accessed by operation 406) to the client device. Upon the client device receiving the markdown data content from the system, the client device can perform operations using the markdown data content as described herein, such as those described operations in accordance with the method 200 of FIG. 2 or the method 300 of FIG. 3. Alternatively, or additionally, the client device can receive the markdown data content to view or edit content of the markdown data content (e.g., via a web-based interface).

Eventually, at operation 410, the processing device receives a request to add a user invokable action at a specific location in the select runbook. For instance, through a graphical user interface (e.g., web-based interface) presented at a client device, a user at the client device can interact with the graphical user interface (e.g., select a graphical button) to add the user invokable action at the specific location in the select runbook, which the user is viewing through the graphical user interface. In response to the request to add the user invokable action, at operation 412, the processing device adds an expression for the user invokable action to a given location in the markdown data content, where the given location corresponds to the specific location in the select runbook. For various embodiments, the expression describes a link associated with metadata, where the metadata comprises the user invokable action for the system (e.g., the external software service server 124). For instance, the request (to add the expression for the user invokable action) can specify a workflow of operations to be associated with the user invokable action, where the workflow of operations can be performed with respect to the system (e.g., the external software service server 124) in response to the user invokable action being invoked by a user (e.g., invoked from the client device).

Figure 5:
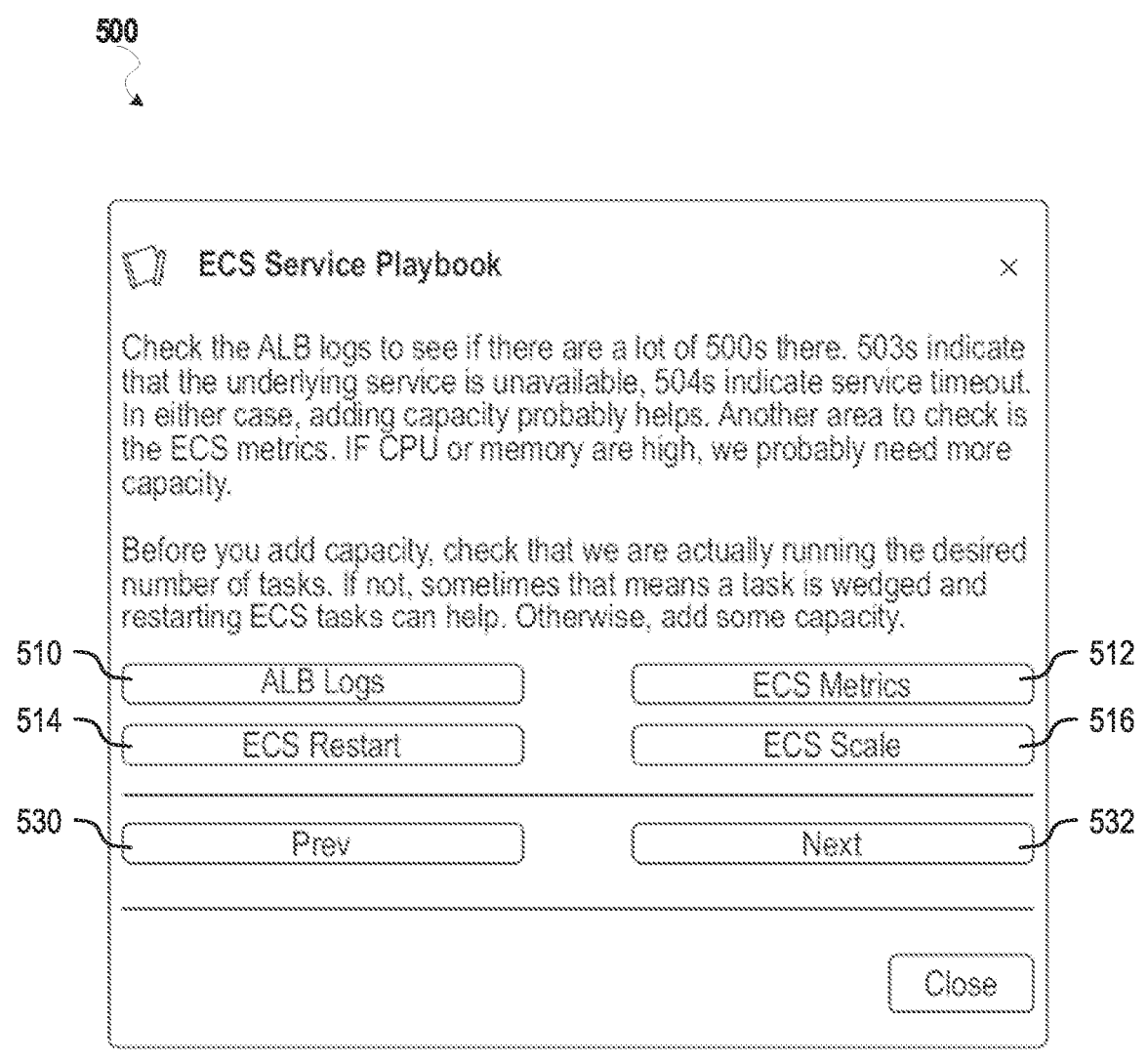

FIG. 5 illustrates an example graphical user interface 500 that is displaying markdown data content, according to some embodiments. For some embodiments, the graphical user interface 500 is rendered by a software tool, such as an IDE or a communication platform (e.g., SLACK), that supports viewing markdown data content. The software tool can operate on a client device and can request markdown data content (e.g., markdown file) from a server. For some embodiments, the markdown data content that causes the graphical user interface 500 to be rendered can document (e.g., implement) a runbook, which can be accessed by a user (e.g., system administrator) and can be used to maintain or operate an external system (e.g., system operating a cloud-based service).

As shown, the graphical user interface 500 comprises rendered graphical buttons 510, 512, 514, 516 that a user can use (e.g., push) to invoke actions associated with links as described herein. In accordance with some embodiments, the user can invoke one or more actions via the buttons 510, 512, 514, 516 without navigating away from the interface 500. One or more of the buttons 510, 512, 514, 516 can be rendered by markdown data content, where each button 510, 512, 514, 516 is rendered as a result of an expression in the markdown data content describing a link associated with metadata. As noted herein, the metadata can be stored on an external system and describe the invokable action.

For some embodiments, after one or more actions are invoked by a user interacting with (e.g., pressing) the buttons 510, 512, 514, 516, the invoked actions can be run (e.g., invoked) in the background on a system (e.g., an external system) associated with the respective action. For instance, when a user presses the button 510, an action can be executed for obtaining an Analyze Load Balancer (ALB) log for an ECS instance (e.g., on an external system). When a user presses the button 512, an action can be executed for obtaining metrics for an AMAZON ECS instance. When a user presses the button 514, an action can be executed for restarting an AMAZON ECS instance that is currently running. When a user presses the button 516, an action can be executed for scaling an AMAZON ECS instance that is currently running. Additionally, the graphical user interface 500 includes graphical user interface buttons 530, 532 that enable a user to traverse to a previous or next data content from the markdown data content.

Figure 6:
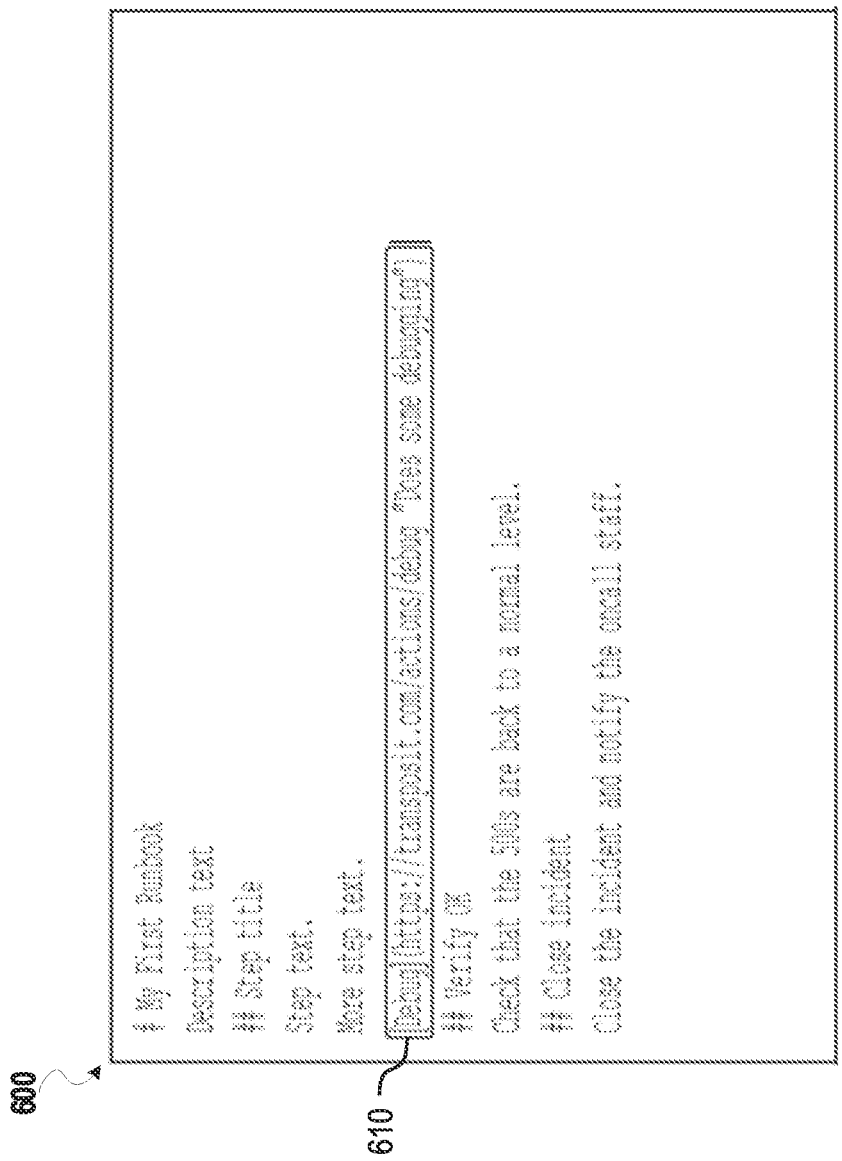
FIG. 6 illustrates an example markdown data content that comprises an expression describing a link, according to some embodiments.

FIG. 6 illustrates an example markdown data content 600 that comprises an expression describing a link, according to some embodiments. For some embodiments, the markdown data content 600 implements a runbook ("My First Runbook") for an external system. As shown, the markdown data content 600 comprises markdown syntax that implements content of the runbook, such as steps to be performed in accordance with the runbook. As also shown, the markdown data content 600 comprises an expression 610 ("[DEBUG] (https://transposit.com/actions/debug "Does some debugging") describing a link associated with metadata, where the metadata comprises a user invokable action for an external system. For the link, the expression 610 includes a label ("[DEBUG]") for a graphical element (e.g., graphical button for a graphical user interface), a URL for metadata associated with the link, and a link description ("Does some debugging").

Figure 7:
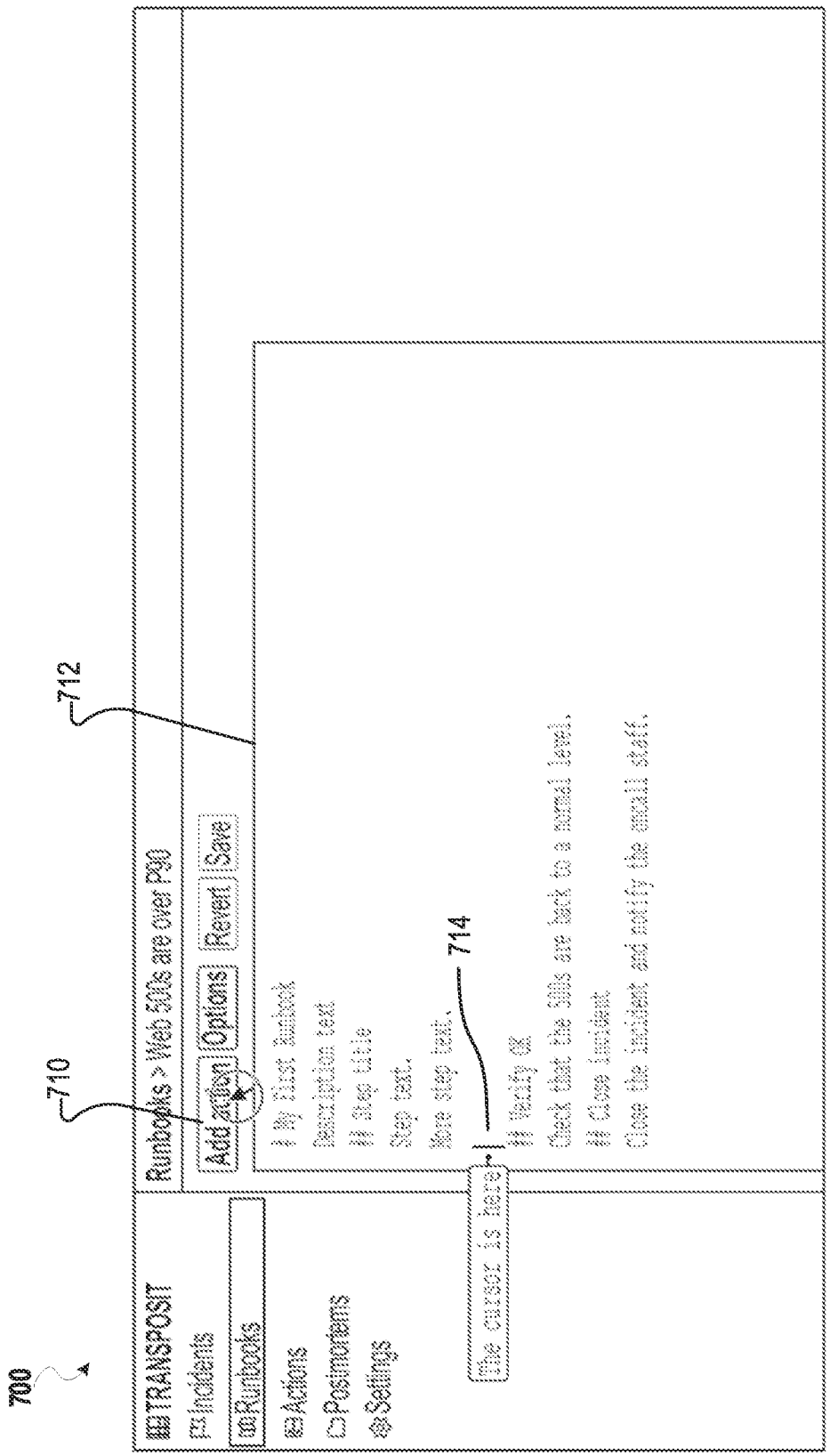
FIGS. 7 through 14 illustrate example graphical user interfaces for accessing and editing markdown data content, according to some embodiments.

FIGS. 7 through 14 illustrate example graphical user interfaces for accessing and editing markdown data content, according to some embodiments. In particular, FIG. 7 illustrates an example graphical user interface 700 for accessing and editing markdown data content, according to some embodiments. For some embodiments, the graphical user interface represents a software application interface or a web-based interface, such as one provided via a web browser application operating on a client device. The graphical user interface 700 can enable a user to view, review, create, or edit one or more runbooks, each of which can be implemented using metadata data content as described herein. As shown, the graphical user interface 700 includes a display 712 of metadata data content for a select runbook entitled "Web 500s are over 900," and a graphical button 710 ("Add Action") that enables a user (at a client device) to add a user invokable action to the select runbook while the select runbook is being edited. The display 712 can be presented to the user when the select runbook is selected for editing by the user. In the display 712, a location 714 in the markdown data content indicates where a cursor is currently located. A user can use the cursor for editing the markdown data content. In response to the user selecting the graphical button 710 to add a user invokable action, an expression for a link bound to a user invokable action (as described herein) can be added to the markdown data content at location 714. Depending on the embodiment, a user can use the graphical user interface 700 to rename, delete, or copy the select runbook.

Figure 8:
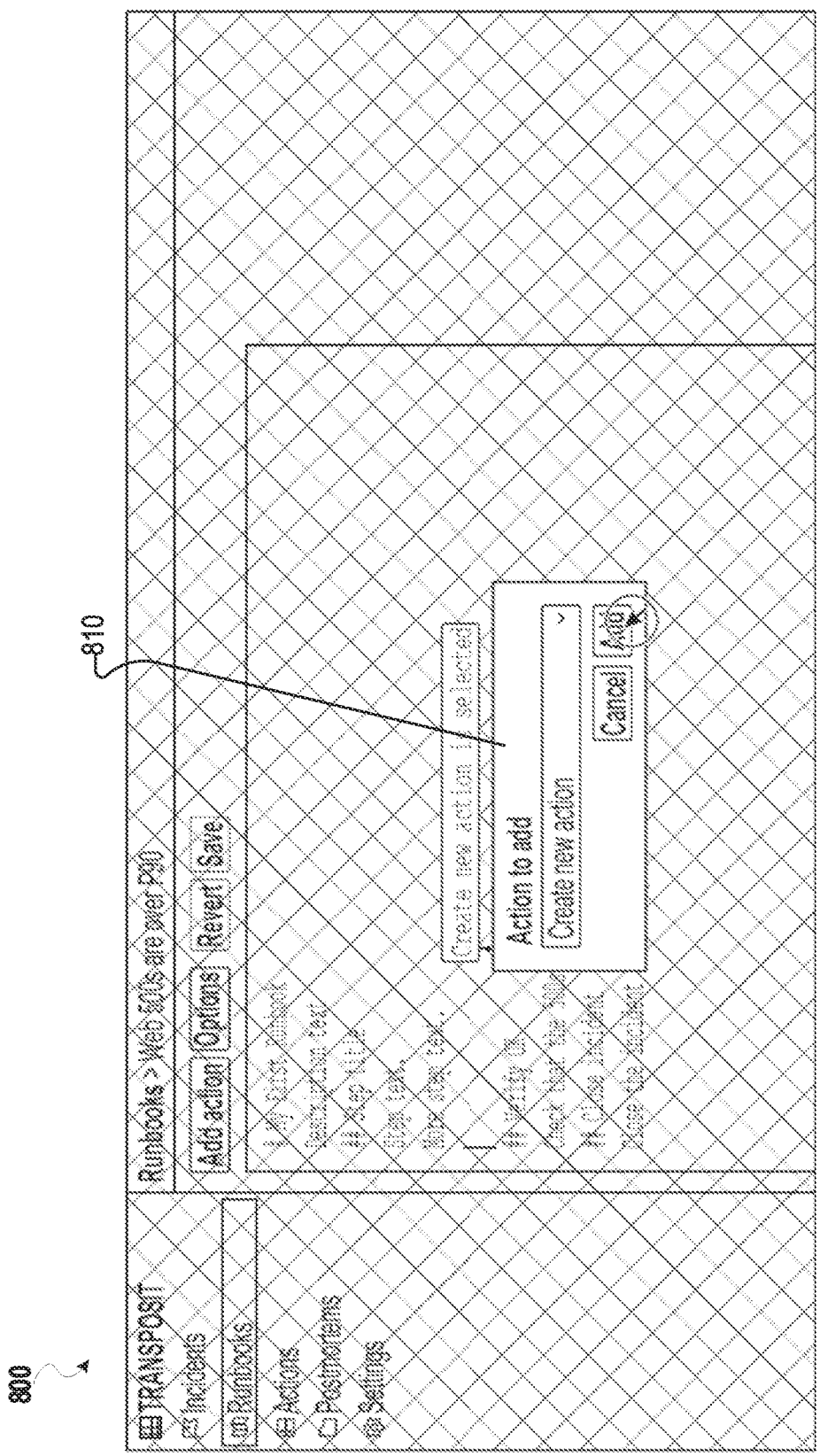

Referring now to FIG. 8, an example graphical user interface 800 is illustrated for accessing and editing markdown data content, according to some embodiments. In particular, a user at a client device can be prompted with the graphical user interface 800 of FIG. 8 in response to the user selecting to add, to markdown data content for a select runbook, a user invokable action. As shown, the graphical user interface 800 presents a graphical element 810, which can enable a user to create a new user invokable action.

Figure 9:
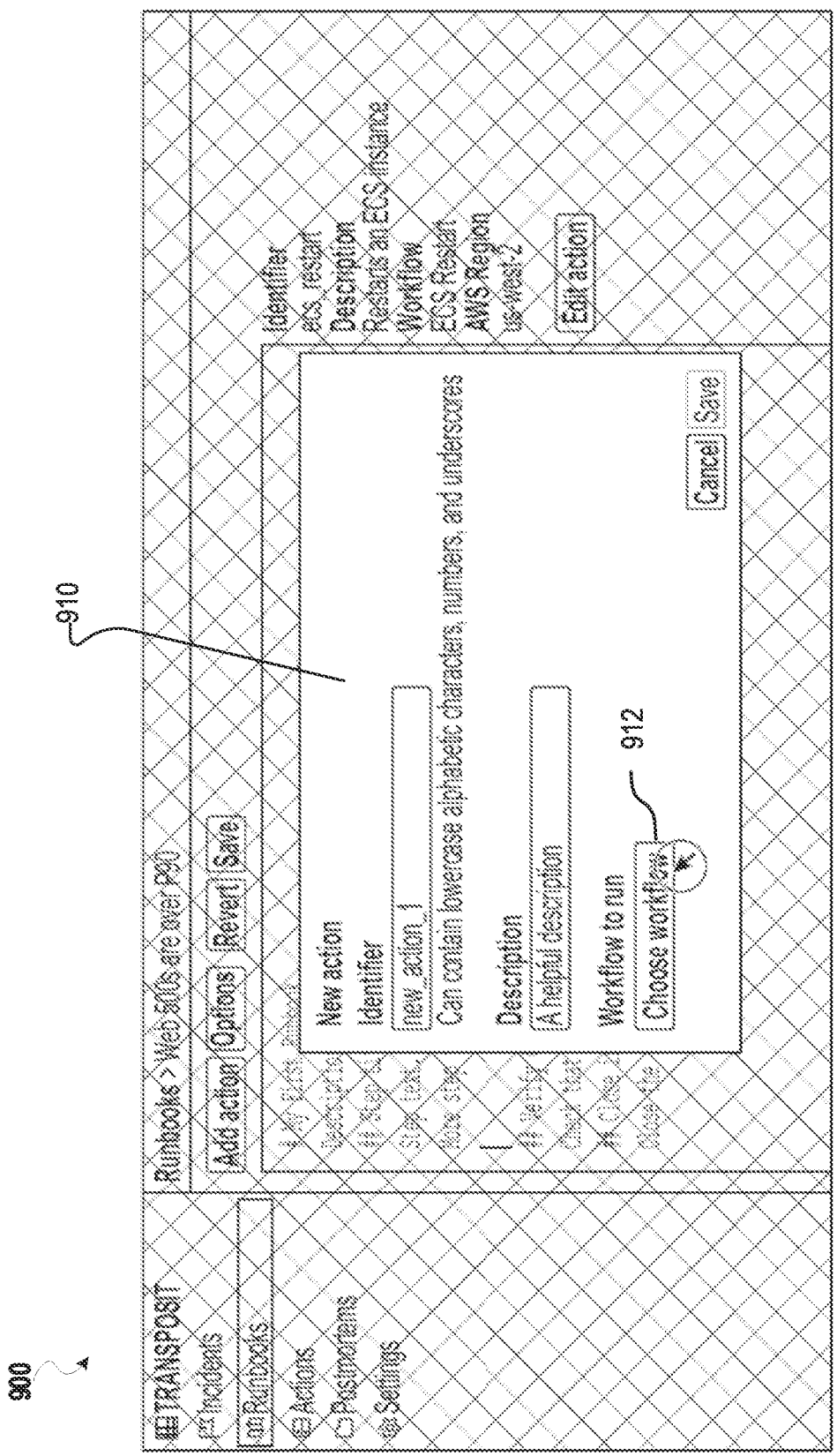

Referring now to FIG. 9, an example graphical user interface 900 is illustrated for accessing and editing markdown data content, according to some embodiments. In particular, a user at a client device can be prompted with the graphical user interface 900 of FIG. 9 in response to a user selecting (via the graphical user interface 800 of FIG. 8) to add a new user invokable action. As shown in display 910 of markdown data content, the graphical user interface 900 can enable a user to assign a user-defined identifier ("new_action_1") for the new user invokable action, to provide a user-defined description ("A helpful description") for the new user invokable action, and to select a workflow for the new user invokable action via a graphical button 912.

Figure 10:
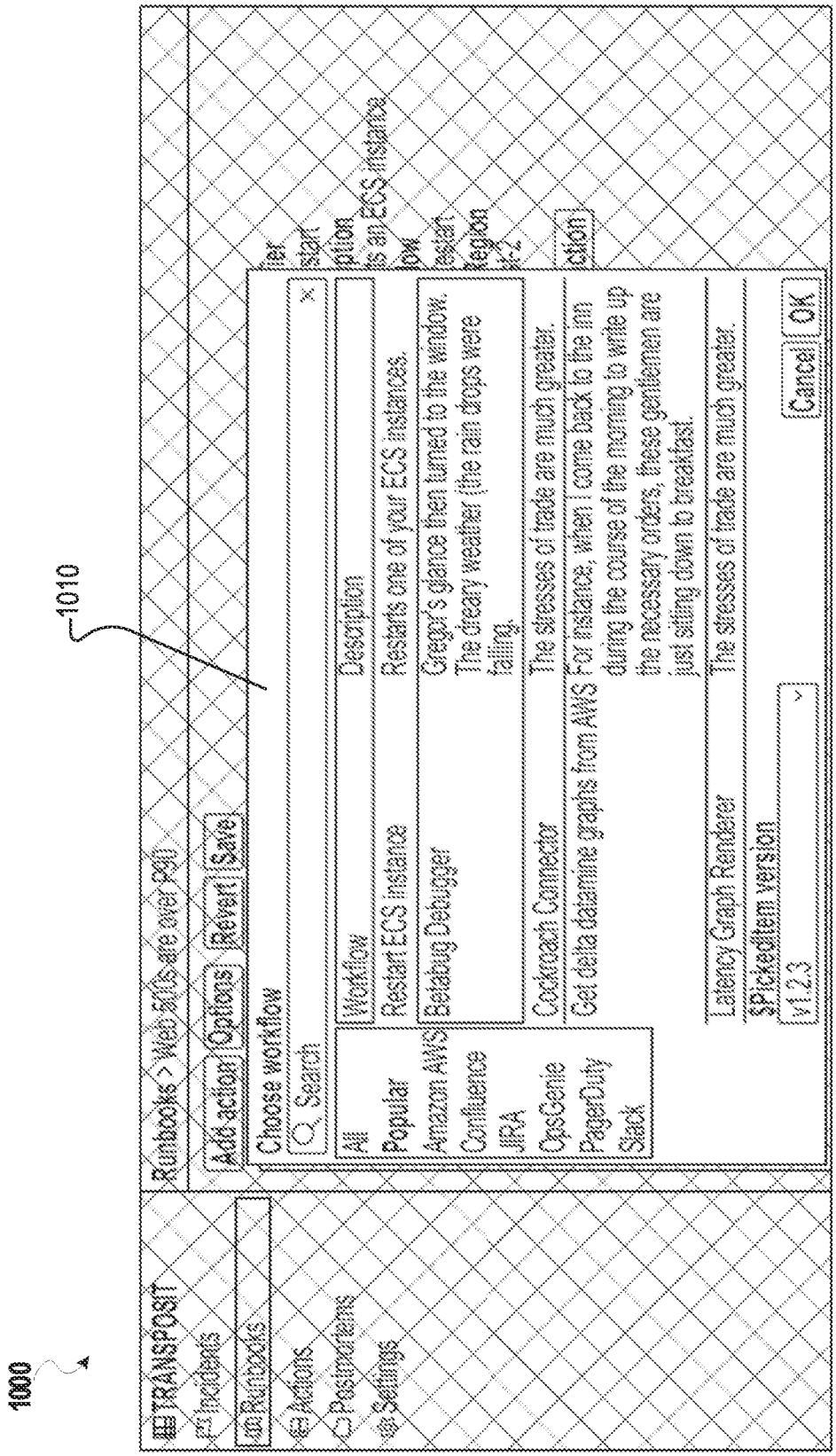

Referring now to FIG. 10, an example graphical user interface 1000 is illustrated for accessing and editing markdown data content, according to some embodiments. In particular, a user at a client device can be prompted with a graphical user interface 1000 of FIG. 10 in response to the user selecting (via the graphical button 912 of the graphical user interface 900 of FIG. 9) to choose a workflow for a new user invokable action. As shown, the graphical user interface 1000 includes a graphical element 1010, which can enable a user to search (e.g., a library of available and predefined workflows) for, and select, a workflow to associate with the new user invokable action.

Figure 11:
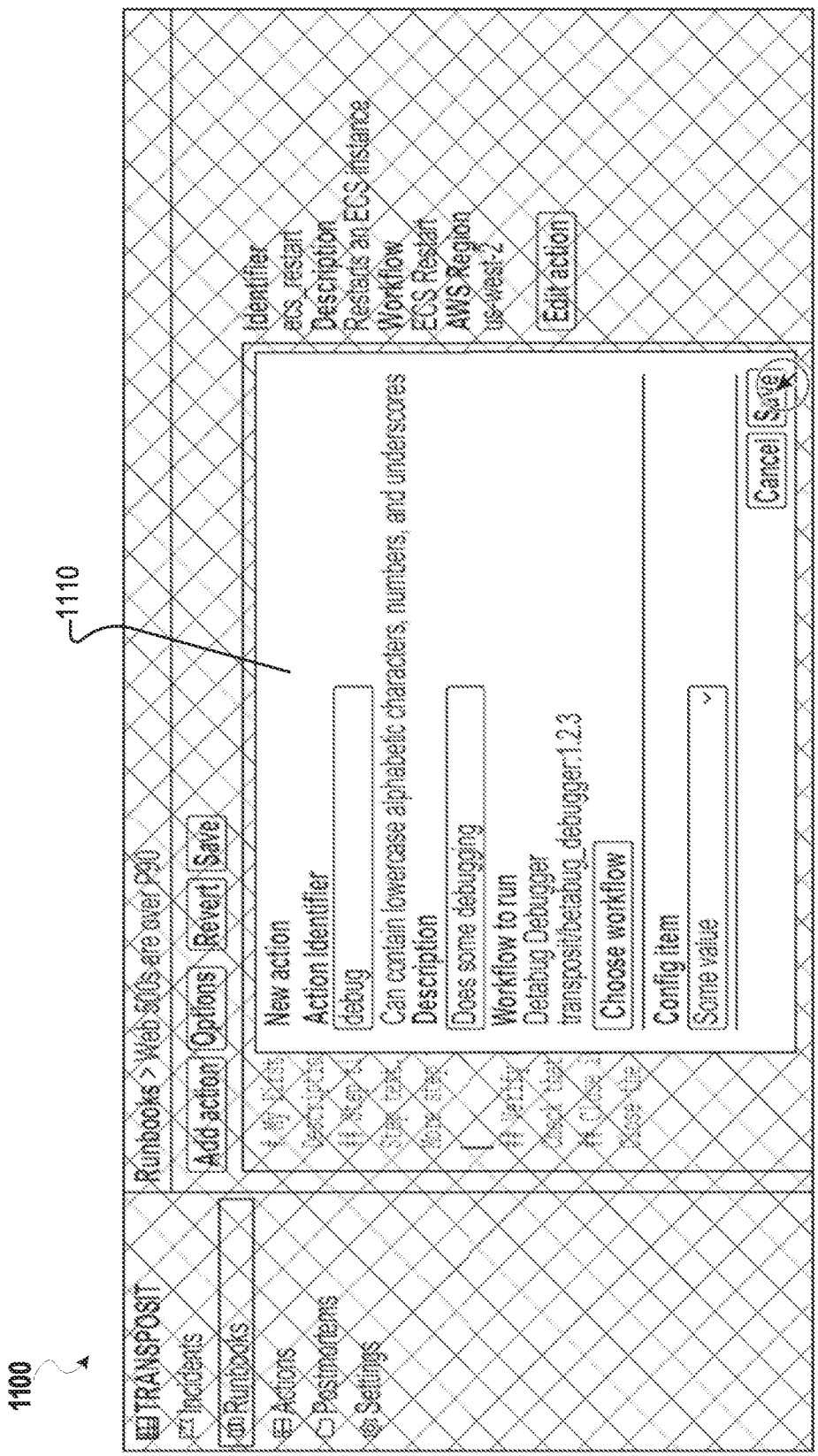

Referring now to FIG. 11, an example graphical user interface 1100 is illustrated for accessing and editing markdown data content, according to some embodiments. In particular, the graphical user interface 1100 of FIG. 11 can be prompted after a user selects (via the graphical user interface 1000 of FIG. 10) a workflow for a new user invokable action. As shown, the graphical user interface 1100 includes a graphical element 1110, which can enable a user to select a configuration item with respect to the link being added to the meta data content.

Figure 12:
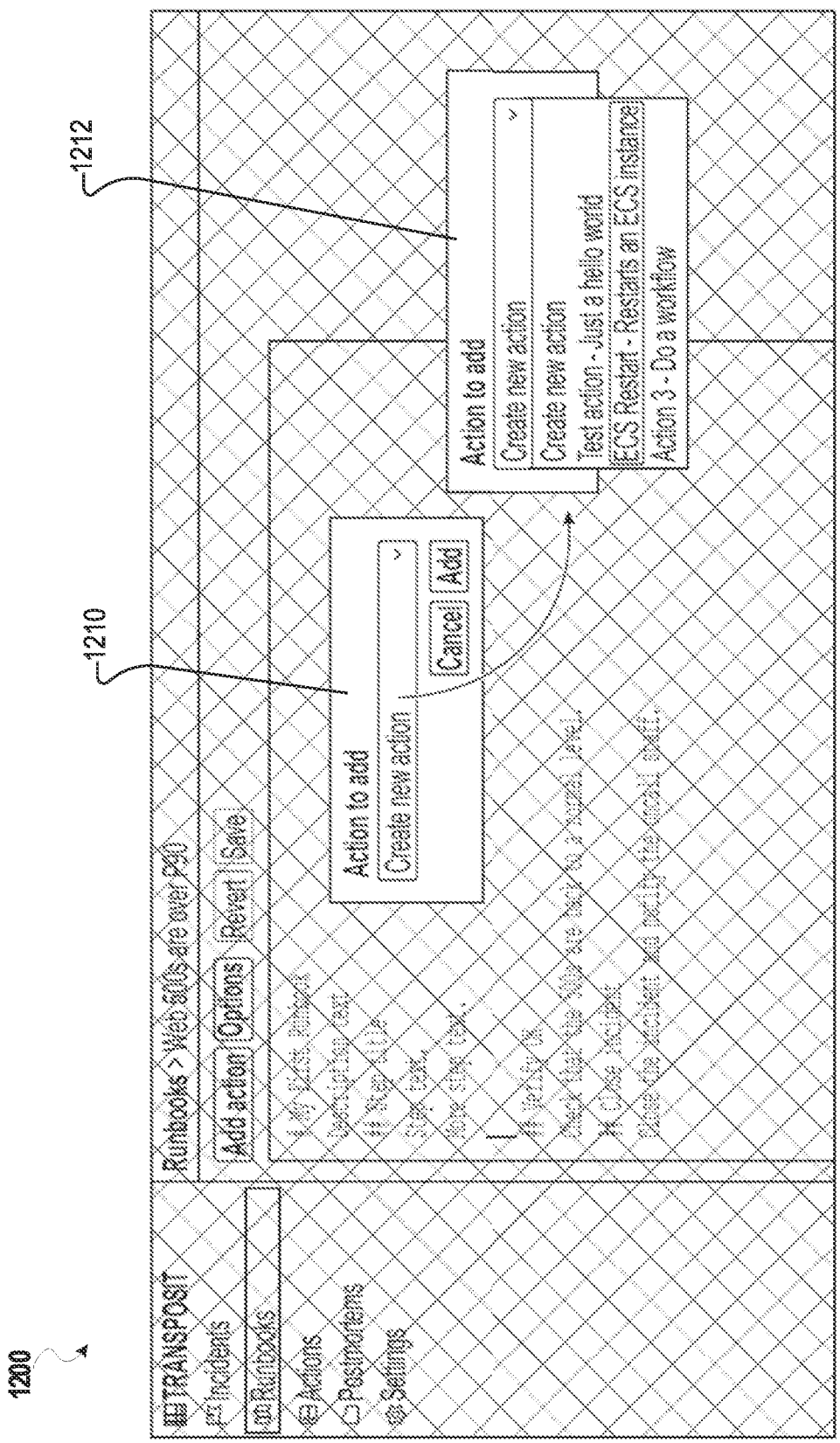

Referring now to FIG. 12, an example graphical user interface 1200 is illustrated for accessing and editing markdown data content, according to some embodiments. In particular, a user at a client device can be prompted with the graphical user interface 1200 of FIG. 12 in response to the user selecting (via the graphical user interface 800 of FIG. 8) to add, to markdown data content for a select runbook, a user invokable action. As shown, the graphical user interface 1200 presents a graphical element 1210, and then a graphical element 1212, which enable a user to select (via a user input) creation of a new user invokable action or select the addition of an predefined/previously-added user invokable action, such as "Test action—Just a hello world," "ECS Restart— Restarts an ECS Instance," and "Action 3—Do a workflow."

Figure 13:
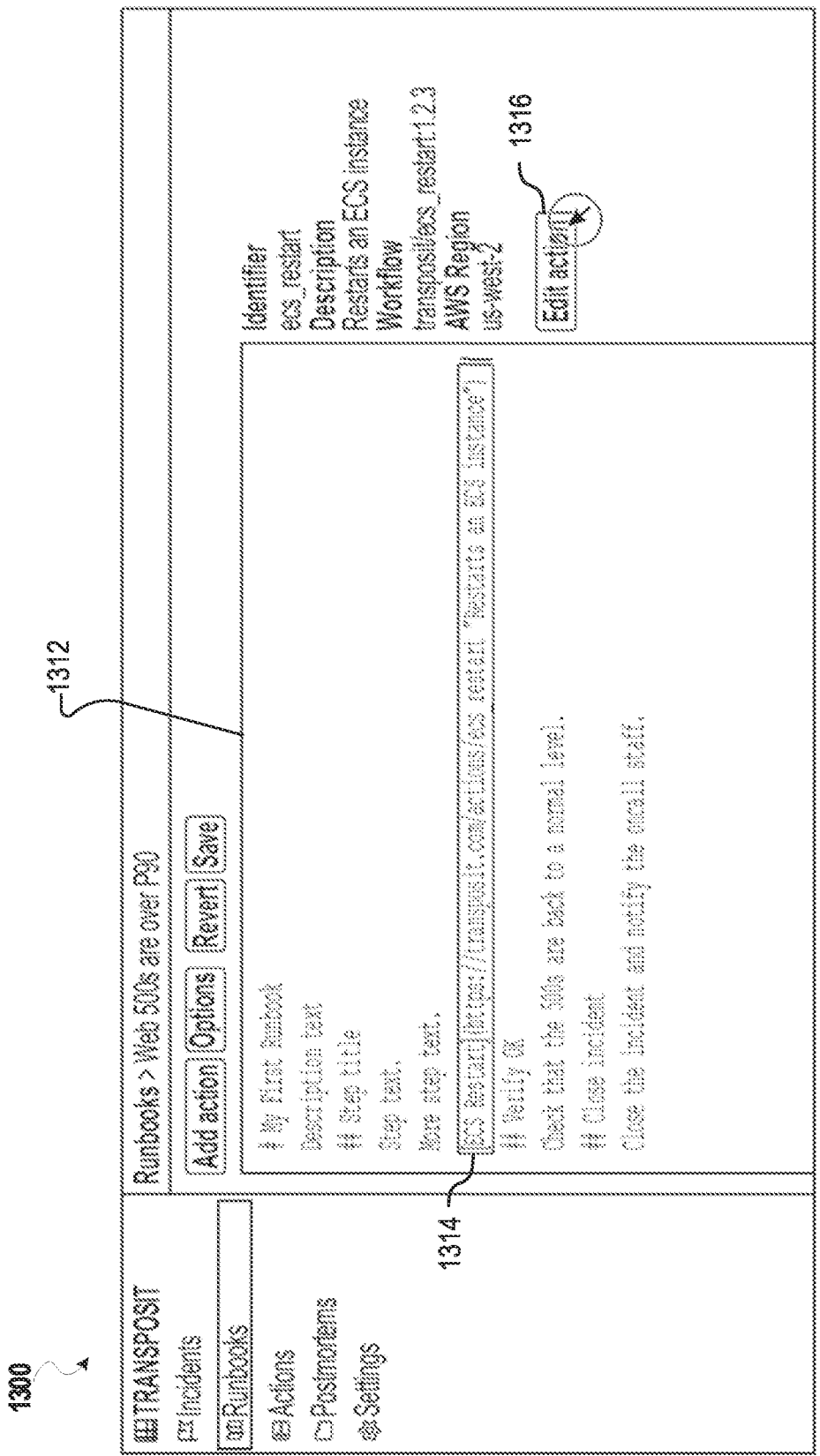

Referring now to FIG. 13, an example graphical user interface 1300 is illustrated for accessing and editing markdown data content, according to some embodiments. In particular, a display 1312 of the graphical user interface 1300 presents markdown data content that includes an expression ("[ECS Restart] (https://transposit.com/actions/ecs_restart) "Restarts an ECS instance")") at a location 1314 of the markdown data content. Additionally, the graphical user interface 1300 includes a graphical button 1316, which can enable a user to edit (e.g., enter edit mode for) the markdown data content.

Figure 14:
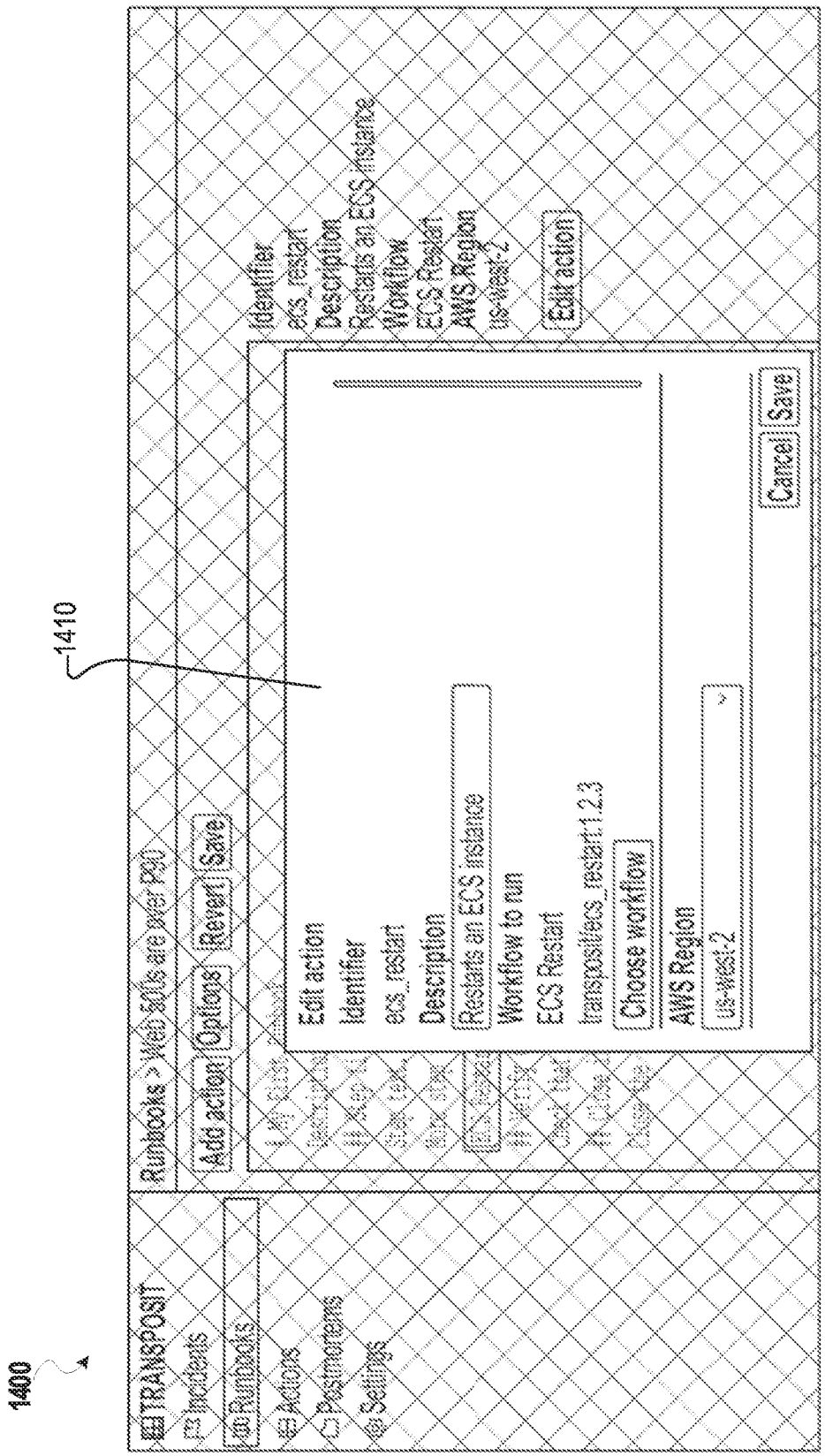

Referring now to FIG. 14, an example graphical user interface 1400 is illustrated for accessing and editing markdown data content, according to some embodiments. In particular, a user at a client device can be prompted with the graphical user interface 1400 of FIG. 14 in response to the user selecting (via the graphical button 1316 of the graphical user interface 1300 of FIG. 13) to edit an existing user invokable action included in the markdown data content of a runbook. As shown, the graphical user interface 1400 includes a graphical element 1410, which can enable a user to edit a description for an existing user invokable action, to choose another workflow for the existing user invokable action, or to change a configuration of the existing user invokable action.

Figure 15:
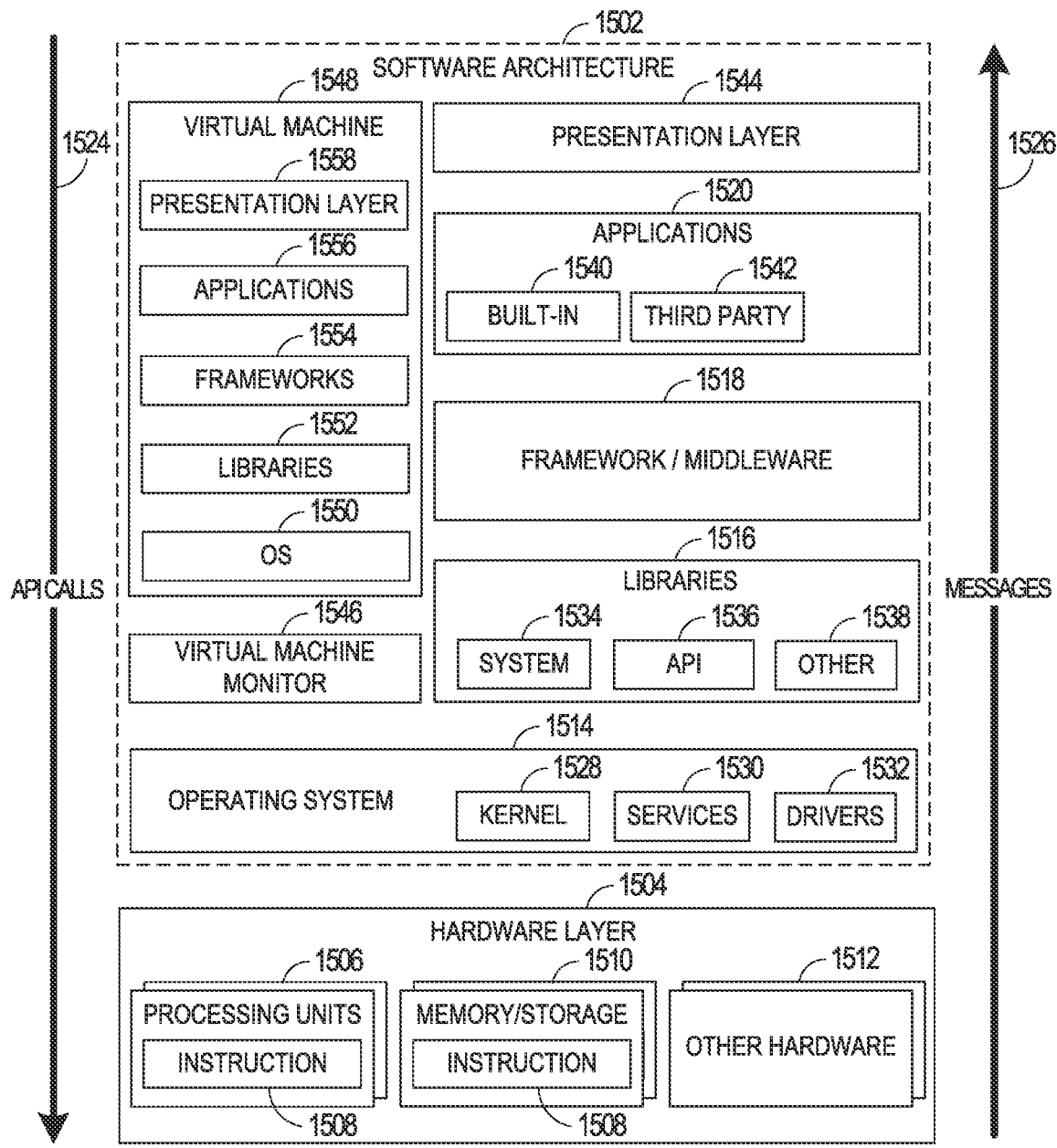
FIG. 15 is a block diagram illustrating a representative software architecture, which may be used in conjunction with various hardware architectures herein described, according to various embodiments of the present disclosure.
Figure 16:
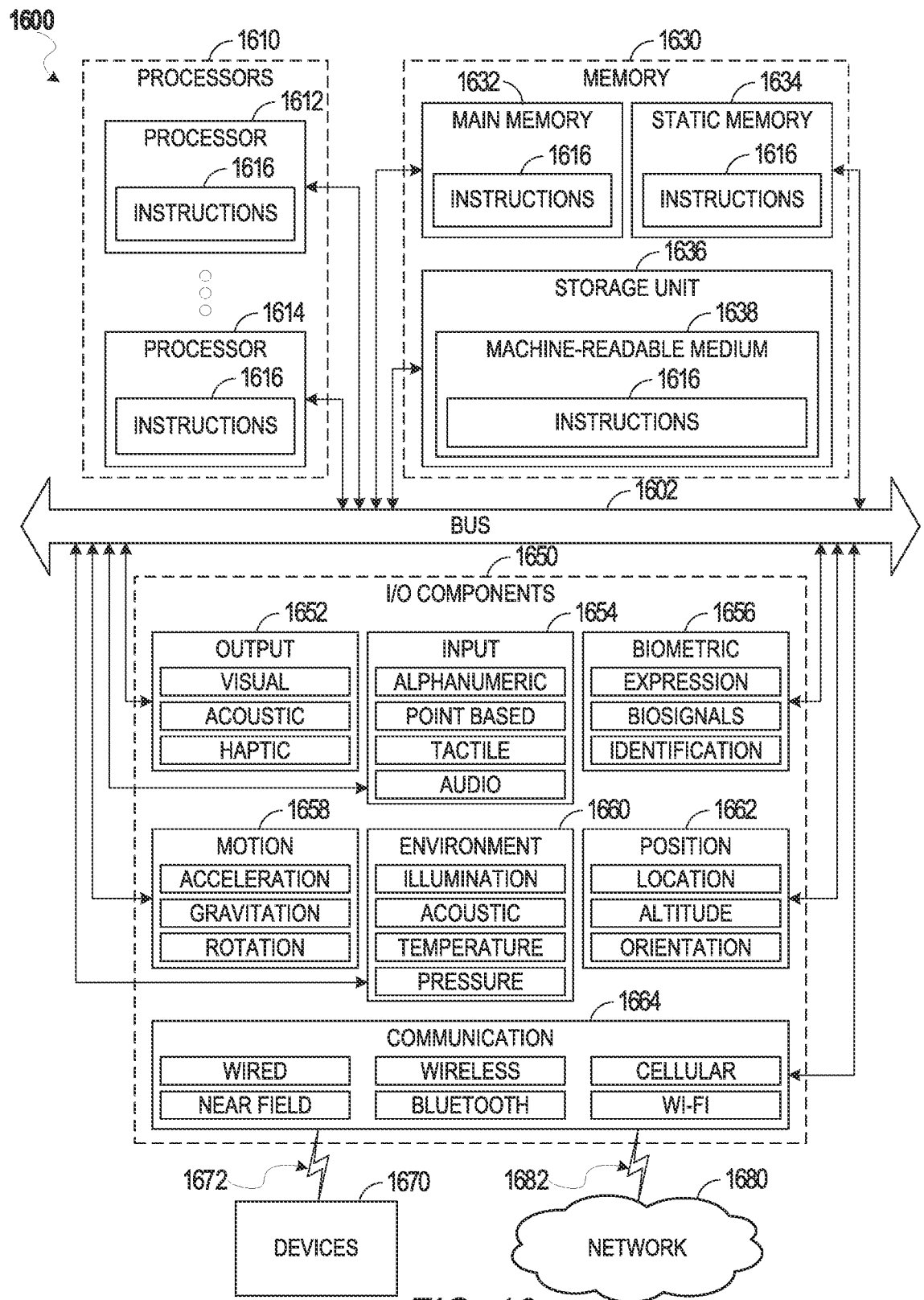
FIG. 16 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 15 or by way of the example machine illustrated by and described with respect to FIG. 16.

FIG. 15 is a block diagram illustrating an example of a software architecture 1502 that may be installed on a machine, according to some example embodiments. FIG. 15 is merely a non-limiting example of a software architecture, and it will be appreciated that many other architectures may be implemented to facilitate the functionality described herein. The software architecture 1502 may be executing on hardware such as a machine 1600 of FIG. 16 that includes, among other things, processors 1610, memory 1630, and I/O components 1650. A representative hardware layer 1504 is illustrated and can represent, for example, the machine 1600 of FIG. 16. The representative hardware layer 1504 comprises one or more processing units 1506 having associated executable instructions 1508. The executable instructions 1508 represent the executable instructions of the software architecture 1502. The hardware layer 1504 also includes memory or storage modules 1510, which also have the executable instructions 1508. The hardware layer 1504 may also comprise other hardware 1512, which represents any other hardware of the hardware layer 1504, such as the other hardware illustrated as part of the machine 1600.

In the example architecture of FIG. 15, the software architecture 1502 may be conceptualized as a stack of layers, where each layer provides particular functionality. For example, the software architecture 1502 may include layers such as an operating system 1514, libraries 1516, frameworks/middleware 1518, applications 1520, and a presentation layer 1544. Operationally, the applications 1520 or other components within the layers may invoke API calls 1524 through the software stack and receive a response, returned values, and so forth (illustrated as messages 1526) in response to the API calls 1524. The layers illustrated are representative in nature, and not all software architectures have all layers. For example, some mobile or special-purpose operating systems may not provide a frameworks/middleware 1518 layer, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be utilized by the applications 1520 and/or other components and/or layers. The libraries 1516 typically provide functionality that allows other software modules to perform tasks in an easier fashion than by interfacing directly with the underlying operating system 1514 functionality (e.g., kernel 1528, services 1530, or drivers 1532). The libraries 1516 may include system libraries 1534 (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 and/or other software components/modules, some of which may be specific to a particular operating system or platform.

The applications 1520 include built-in applications 1540 and/or third-party applications 1542. Examples of representative built-in applications 1540 may include, but are not limited to, a home application, a contacts application, a browser application, a book reader application, a location application, a media application, a messaging application, or a game application.

The third-party applications 1542 may include any of the built-in applications 1540, as well as a broad assortment of other applications. In a specific example, the third-party applications 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 1542 may invoke the API calls 1524 provided by the mobile operating system such as the operating system 1514 to facilitate functionality described herein.

The applications 1520 may utilize built-in operating system functions (e.g., kernel 1528, services 1530, or drivers 1532), libraries (e.g., system libraries 1534, API libraries 1536, and other libraries 1538), or frameworks/middleware 1518 to create user interfaces to interact with users of the system. Alternatively, or additionally, in some systems, interactions with a user may occur through a presentation layer, such as the presentation layer 1544. In these systems, the application/module "logic" can be separated from the aspects of the application/module that interact with the user.

Some software architectures utilize virtual machines. In the example of FIG. 15, this is illustrated by a virtual machine 1548. The virtual machine 1548 creates a software environment where applications/modules can execute as if they were executing on a hardware machine (e.g., the machine 1600 of FIG. 16). The virtual machine 1548 is hosted by a host operating system (e.g., the operating system 1514) and typically, although not always, has a virtual machine monitor 1546, which manages the operation of the virtual machine 1548 as well as the interface with the host operating system (e.g., the operating system 1514). A software architecture executes within the virtual machine 1548, such as an operating system 1550, libraries 1552, frameworks/middleware 1554, applications 1556, or a presentation layer 1558. These layers of software architecture executing within the virtual machine 1548 can be the same as corresponding layers previously described or may be different.

FIG. 16 illustrates a diagrammatic representation of a machine 1600 in the form of a computer system within which a set of instructions may be executed for causing the machine 1600 to perform any one or more of the methodologies discussed herein, according to an embodiment. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example, the instructions 1616 may cause the machine 1600 to execute any one of methods 200, 300, 400 described above with respect to FIGS. 2-4. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 1616, sequentially or otherwise, that specify actions to be taken by the machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an embodiment, the processors 1610 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1612 and a processor 1614 that may execute the instructions 1616. The term "processor" is intended to include multi-core processors that may comprise two or more independent processors (sometimes referred to as "cores") that may execute instructions contemporaneously. Although FIG. 16 shows multiple processors 1610, the machine 1600 may include a single processor with a single core, a single processor with multiple cores (e.g., a multi-core processor), multiple processors with a single core, multiple processors with multiples cores, or any combination thereof.

The memory 1630 may include a main memory 1632, a static memory 1634, and a storage unit 1636 including machine-readable medium 1638, each accessible to the processors 1610 such as via the bus 1602. The main memory 1632, the static memory 1634, and the storage unit 1636 store the instructions 1616 embodying any one or more of the methodologies or functions described herein. The instructions 1616 may also reside, completely or partially, within the main memory 1632, within the static memory 1634, within the storage unit 1636, within at least one of the processors 1610 (e.g., within the processor's cache memory), or any suitable combination thereof, during execution thereof by the machine 1600.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion, and the grouping is in no way limiting. In various embodiments, the I/O components 1650 may include output components 1652 and input components 1654. The output components 1652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1650 may include biometric components 1656, motion components 1658, environmental components 1660, or position components 1662, among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or another suitable device to interface with the network 1680. In further examples, the communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1600 including processors 1610), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1600, but deployed across a number of machines 1600. In some example embodiments, the processors 1610 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 1630, 1632, 1634, and/or the memory of the processor(s) 1610) and/or the storage unit 1636 may store one or more sets of instructions 1616 and data structures (e.g., software) embodying or utilized by any one or more of the methodologies or functions described herein. These instructions (e.g., the instructions 1616), when executed by the processor(s) 1610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1616 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 1680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network, and the coupling 1682 may be a Code Division Multiple Access (CDMA) connection, a Global System for Mobile communications (GSM) connection, or another type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 1670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A system comprising:
a memory storing instructions; and
one or more hardware processors communicatively coupled to the memory and configured by the instructions to perform operations comprising:
  processing markdown data content to render the markdown data content for display through a graphical user interface, the markdown data content comprising an expression describing a link, the markdown data content describing a runbook for an external system, the runbook comprising a runbook workflow of operations for the external system, the processing comprising:
    determining that the link is associated with metadata, the metadata describing a user invokable action, the user invokable action being associated with the runbook workflow of operations to be performed with respect to the external system when the user invokable action is invoked by a user; and
    in response to determining that the link is associated with the metadata, causing a graphical element to be rendered in association with the metadata, the graphical element being selectable by the user to invoke execution of the user invokable action.

2. The system of claim 1, the operations comprising:
receiving a user selection of the graphical element; and
in response to the user selection, causing execution of the user invokable action without navigating away from rendered markdown data content.

3. The system of claim 1, wherein the user invokable action comprises at least one of starting, restarting, pausing, or stopping a service operating on the external system.

4. The system of claim 1, wherein the expression uses markdown syntax configured to bind the markdown data content to the metadata.

5. The system of claim 1, wherein the markdown data content is stored in a markdown file.

6. The system of claim 1, wherein the link comprises a domain name address.

7. The system of claim 1, wherein the link comprises a universal resource locator.

8. The system of claim 1, wherein the graphical element comprises a button.

9. The system of claim 1, wherein the expression is a first expression, the link is a first link, and the metadata is first metadata, the operations comprising:
receiving a request to add to the markdown data content a new user invokable action for an external system; and
based on the request, causing a second expression to be added to the markdown data content, the second expression describing a second link associated with second metadata, the second metadata comprising the new user invokable action for the external system.

10. The system of claim 9, wherein the causing of the second expression to be added to the markdown data content comprises:
receiving a user input that selects the new user invokable action from a plurality of available user invokable actions; and
receiving a user-defined description for the new user invokable action.

11. The system of claim 10, wherein the user input is a first user input, and wherein the causing of the second expression to be added to the markdown data content comprises:
receiving a second user input that selects a workflow, from a plurality of available workflows, to be performed in response to the new user invokable action being invoked by a user.

12. The system of claim 11, wherein the causing of the second expression to be added to the markdown data content comprises:
receiving a third user input that provides one or more settings to be used by the workflow when the workflow is performed in response to the new user invokable action being invoked by the user.

13. A method comprising:
processing, by one or more hardware processors, markdown data content to render the markdown data content for display through a graphical user interface, the markdown data content comprising an expression describing a link, the markdown data content describing a runbook for an external system, the runbook comprising a runbook workflow of operations for the external system, the processing comprising:
  determining, by the one or more hardware processors, that the link is associated with metadata, the metadata describing a user invokable action, the user invokable action being associated with the runbook workflow of operations to be performed with respect to the external system when the user invokable action is invoked by a user; and
  in response to determining that the link is associated with the metadata, causing, by the one or more hardware processors, a graphical element to be rendered in association with the metadata, the graphical element being selectable by the user to invoke execution of the user invokable action.

14. The method of claim 13, comprising:
receiving, by the one or more hardware processors, a user selection of the graphical element; and
in response to the user selection, causing, by the one or more hardware processors, execution of the user invokable action without navigating away from rendered markdown data content.

15. The method of claim 13, wherein the user invokable action comprises at least one of starting, restarting, pausing, or stopping a service operating on the external system.

16. The method of claim 13, wherein the expression uses markdown syntax configured to bind the markdown data content to the metadata.

17. The method of claim 13, wherein the expression is a first expression, the link is a first link, and the metadata is first metadata, the method comprising:

receiving, by the one or more hardware processors, a request to add to the markdown data content a new user invokable action for an external system; and based on the request, causing, by the one or more hardware processors, a second expression to be added to the markdown data content, the second expression describing a second link associated with second metadata, the second metadata comprising the new user invokable action for the external system.

18. The method of claim 17, wherein the causing of the second expression to be added to the markdown data content comprises:

receiving a user input that selects the new user invokable action from a plurality of available user invokable actions; and receiving a user-defined description for the new user invokable action.

19. The method of claim 18, wherein the user input is a first user input, and wherein the causing of the second expression to be added to the markdown data content comprises:

receiving a second user input that selects a workflow, from a plurality of available workflows, to be performed in response to the new user invokable action being invoked by a user.

20. A non-transitory computer-readable medium comprising instructions that, when executed by one or more hardware processors of a device, cause the device to perform operations comprising:

processing markdown data content to render the markdown data content for display through a graphical user interface, the markdown data content comprising an expression describing a link, the markdown data content describing a runbook for an external system, the runbook comprising a runbook workflow of operations for the external system, the processing comprising:

determining that the link is associated with metadata, the metadata describing a user invokable action, the user invokable action being associated with the runbook workflow of operations to be performed with respect to the external system when the user invokable action is invoked by a user; and in response to determining that the link is associated with the metadata, causing a graphical element to be rendered in association with the metadata, the graphical element being selectable by the user to invoke execution of the user invokable action.

* * * * *